(No Model.)
A. LEONHARDT.
VEGETABLE CUTTER.
No. 330,246. Patented Nov. 10, 1885.
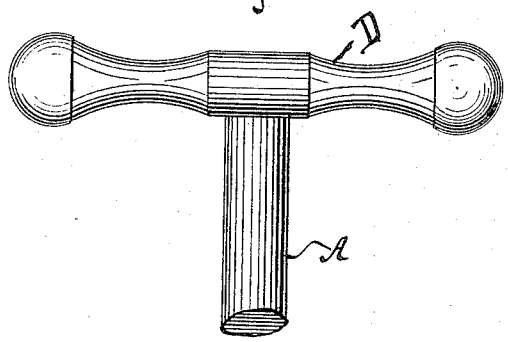
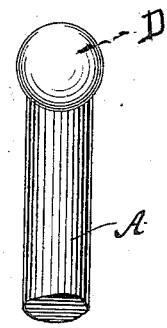
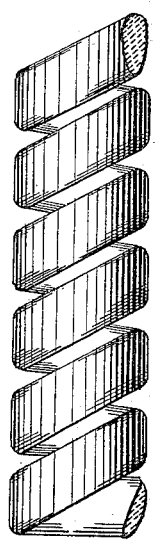
WITNESSES
William Miller
A Faber du Faur Jr.
INVENTOR
Adam Leonhardt
Van Santvoord & Hauff
his Attorneys

UNITED STATES PATENT OFFICE.

ADAM LEONHARDT, OF NEW YORK, N. Y.

VEGETABLE-CUTTER.

SPECIFICATION forming part of Letters Patent No. 330,246, dated November 10, 1885.

Application filed August 27, 1885. Serial No. 175,467. (No model.)

*To all whom it may concern:*

Be it known that I, ADAM LEONHARDT, a citizen of the United States, residing at New York, in the county and State of New York, have invented new and useful Improvements in Vegetable-Cutters, of which the following is a specification.

My invention relates to improvements in devices for cutting fruits, vegetables, or other similar articles of food into coils; and it consists, essentially, in such a device composed of a shank, one end of which is twisted to form a screw-auger, and a cutter-blade secured to the shank above the screw-auger, which cutter-blade is provided with a clearing-cutter which cuts around the coil produced by the cutter-blade and separates the said coil completely from the body of the article, so that the coil can be easily removed.

The novel features of the parts above enumerated, which constitute the main features of the device, are more fully pointed out in the following specification and claims, and illustrated in the accompanying drawings, in which—

Figure 1 represents a face view of my improved device. Fig. 2 is a side elevation of the same. Fig. 3 is an elevation of a coil as cut by my device.

Similar letters indicate corresponding parts.

In the drawings, the letter A designates the shank of the device, to which is attached a cutter-blade, B, which, in the example shown in the drawings, extends outward from the shank, and then curves downward; but it is evident that the shape of this cutter-blade can be varied to cut coils of different cross-sections. The outwardly-extending part of the cutter-blade B makes an angle with the horizontal plane, so that by rotating the shank the cutter-blade will cut into the vegetable and cut therefrom a coil; but in order to facilitate the operation, and to insure a uniform diameter of the windings of the coil, I secure the said cutter-blade to the shank at some distance above its lower end, and into the part below the cutter-blade are cut threads; or the shank may be twisted to form a screw-auger, C, which is adapted to take hold of the material operated upon and feed the cutter-blade downward.

Although a device consisting of the parts hereinbefore described would operate to cut a coil from the fruit or vegetable, yet I have found it difficult to remove the coil so cut from the body of the fruit or vegetable; and to obviate this difficulty I provide the device with a clearing-blade, B', which extends upward from the cutter at the proper distance outward from the shank A to insure the clearing of coil from the bulk of the article operated upon. The top end of the shank is suitably formed to receive a handle, D, which is removably fitted thereto, so that when the coil is cut from the article the holder can be removed from the same by simply drawing the holder through the coil from the end opposite to that which it entered. The cut coil can now be easily removed from the article, leaving a clean hole in the body of the fruit or vegetable, whereby the same is in a condition for use for various purposes.

Instead of securing the cutter-blade B and cleaning-blade B' (which latter two are made integral) to the shank A, the entire device, with the exception of the handle, can be cast in one piece.

Heretofore a device for cutting articles of food into coils has been composed of an endless knife in the form of an annulus arranged diagonally on a holder, which is provided with an auger and a handle. Such construction of knife is not my invention.

What I claim as new, and desire to secure by Letters Patent, is—

1. The combination, with the shank A, of the cutter-blade B and the clearing-blade B', substantially as shown and described.

2. The combination, with the shank A and the auger C, of the cutter-blade B and the clearing-blade B', substantially as shown and described.

3. An implement for cutting fruits and vegetables into coils, consisting of a shank having between its ends an attached outwardly-projecting cutting-blade, B, constructed at its outer end with a curved cutting-extension, substantially as described.

4. An implement for cutting fruits and vegetables into coils, consisting of a shank having at one end a feeding-screw or auger and at the opposite end a detachable handle and a horizontal cutting-blade extending outwardly from the shank adjacent to the screw or auger, and having its outer end constructed with a curved cutting-extension, substantially as described.

5. As a new article of manufacture, a device for cutting coils, consisting of a shank, A, having thereon a blade, B, a clearing-blade, B', extending upward from the cutter, the auger C, and the removable handle D, substantially as shown and described.

In testimony whereof I have hereunto set my hand and seal in the presence of two subscribing witnesses.

ADAM LEONHARDT. [L. S.]

Witnesses:
   A. FABER DU FAUR, Jr.,
   E. F. KASTENHUBER.